（12）United States Patent
Cho et al.

(10) Patent No.: US 7,633,883 B2
(45) Date of Patent: Dec. 15, 2009

(54) SYSTEM AND METHOD FOR CONTROLLING NETWORK TRAFFIC

(76) Inventors: Chang Hwan Cho, #22-1207, Hanyang 2-Cha Apartment, Songpa 2-dong, Songpa-gu, Seoul (KR) 138-172; Tae Boong Jeon, #327-307, Hanyang Apartment, 91, Seohyun-dong, Bundang-gu, Seongnam-si, Gyeonggi-do, Seongnam-si (KR) 463-050

( * ) Notice: Subject to any disclaimer, the term of this patent is extended or adjusted under 35 U.S.C. 154(b) by 522 days.

(21) Appl. No.: 11/474,237

(22) Filed: Jun. 23, 2006

(65) Prior Publication Data

US 2006/0291480 A1 Dec. 28, 2006

(30) Foreign Application Priority Data

Jun. 23, 2005 (KR) ...................... 10-2005-0054514

(51) Int. Cl.
*H04L 12/24* (2006.01)
(52) U.S. Cl. .................. 370/252; 370/401; 709/221
(58) Field of Classification Search .................. 370/252, 370/389, 390, 392, 400, 401, 428; 709/220–222, 709/229, 245
See application file for complete search history.

(56) References Cited

U.S. PATENT DOCUMENTS

| | | | | |
|---|---|---|---|---|
| 5,825,772 A | * | 10/1998 | Dobbins et al. | 370/396 |
| 6,151,324 A | * | 11/2000 | Belser et al. | 370/397 |
| 6,563,832 B1 | * | 5/2003 | Stuart et al. | 370/403 |
| 6,751,191 B1 | * | 6/2004 | Kanekar et al. | 370/217 |
| 2002/0124107 A1 | * | 9/2002 | Goodwin | 709/242 |

* cited by examiner

*Primary Examiner*—Michael J Moore, Jr.
*Assistant Examiner*—Duc T Duong
(74) *Attorney, Agent, or Firm*—Ohlandt, Greeley, Ruggiero & Perle, LLP (57) ABSTRACT

Disclosed are system and method for controlling a network traffic. According to the invention, all switches connected with the same VLAN are allowed to share an inherent ID of each switch, a port ID connecting the switches and information about a bandwidth so as to calculate an optimized path that each switch is connected to other switches. For doing so, each switch is systematically structured to comprise a computation module capable of structuring a neighbor relation with other switches, a computation module capable of exchanging/sharing the switch state D/B with the other switches, and synchronizing a corresponding switch state D/B, a computation module capable of creating/updating a switching table, and a computation module capable of switching and flooding a received data frame through an optimized path with reference to the created/updated switching table.

7 Claims, 10 Drawing Sheets

| destination MAC | source MAC | frame type | destination switch ID | source switch ID | Hop limit | 802.1Q | length/ type | data | CRC |

Fig.5

| type = 1 | frame length | authentication password | neighbor switch list |

Fig.6a

| VLAN ID | neighbor switch ID | connecting port |
|---|---|---|
| 1 | 2 | 114 |
| 1 | 3 | 113 |

Fig.6b

| VLAN ID | neighbor switch ID | connecting port |
|---|---|---|
| 1 | 1 | 124 |
| 1 | 4 | 123 |

Fig.6c

| VLAN ID | neighbor switch ID | connecting port |
|---|---|---|
| 1 | 1 | 133 |
| 1 | 4 | 134 |

Fig.6d

| VLAN ID | neighbor switch ID | connecting port |
|---|---|---|
| 1 | 2 | 143 |
| 1 | 3 | 144 |

Fig.7

| type = 2 | frame length | authentication password | sequence number | acknowledgement number |
|---|---|---|---|---|
| originating switch ID | neighbor switch ID | port ID | serial number | bandwidth |
| VLAN amount | VLAN ID 1 | VLAN ID 2 | ... | VLAN ID n |
| originating switch ID | neighbor switch ID | port ID | serial number | bandwidth |
| VLAN amount | VLAN ID 1 | VLAN ID 2 | ... | VLAN ID n |
| ... | | | | |

Fig.8

| VLAN ID | originating switch ID | neighbor switch ID | port ID | bandwidth | serial number |
|---|---|---|---|---|---|
| 1 | 1 | 2 | 114 | 100 | 1 |
| 1 | 1 | 3 | 113 | 100 | 1 |
| 1 | 2 | 1 | 124 | 100 | 1 |
| 1 | 2 | 4 | 123 | 100 | 1 |
| 1 | 3 | 1 | 133 | 100 | 1 |
| 1 | 3 | 4 | 134 | 100 | 1 |
| 1 | 4 | 2 | 143 | 100 | 1 |
| 1 | 4 | 3 | 144 | 100 | 1 |

Fig.9a

| VLAN ID | destination switch ID | path cost | output port |
|---|---|---|---|
| 1 | 2 | 100 | 114 |
| 1 | 3 | 100 | 113 |
| 1 | 4 | 200 | 113, 114 |

Fig.9b

| VLAN ID | destination switch ID | path cost | output port |
|---|---|---|---|
| 1 | 1 | 100 | 124 |
| 1 | 3 | 200 | 123, 124 |
| 1 | 4 | 100 | 123 |

Fig.9c

| VLAN ID | destination switch ID | path cost | output port |
|---|---|---|---|
| 1 | 1 | 100 | 133 |
| 1 | 2 | 200 | 133, 134 |
| 1 | 4 | 100 | 134 |

Fig.9d

| VLAN ID | destination switch ID | path cost | output port |
|---|---|---|---|
| 1 | 1 | 200 | 143, 144 |
| 1 | 2 | 100 | 143 |
| 1 | 3 | 100 | 144 |

Fig.10a

| VLAN ID | switch ID | MAC address | output port | aging time |
|---|---|---|---|---|
| 1 | 1 | 1515.1515.1515 | 111 | 1 |
| 1 | 1 | 1616.1616.1616 | 112 | 1 |
| 1 | 2 | 2525.2525.2525 | 114 | 1 |
| 1 | 2 | 2626.2626.2626 | 114 | 1 |
| 1 | 3 | 3535.3535.3535 | 113 | 1 |
| 1 | 3 | 3636.3636.3636 | 113 | 1 |
| 1 | 4 | 4545.4545.4545 | <u>113</u>, 114 | 1 |
| 1 | 4 | 4646.4646.4646 | 113, <u>114</u> | 1 |

Fig.10b

| VLAN ID | switch ID | MAC address | output port | aging time |
|---|---|---|---|---|
| 1 | 1 | 1515.1515.1515 | 124 | 1 |
| 1 | 1 | 1616.1616.1616 | 124 | 1 |
| 1 | 2 | 2525.2525.2525 | 121 | 1 |
| 1 | 2 | 2626.2626.2626 | 122 | 1 |
| 1 | 3 | 3535.3535.3535 | <u>123</u>, 124 | 1 |
| 1 | 3 | 3636.3636.3636 | 123, <u>124</u> | 1 |
| 1 | 4 | 4545.4545.4545 | 123 | 1 |
| 1 | 4 | 4646.4646.4646 | 123 | 1 |

Fig.10c

| VLAN ID | switch ID | MAC address | output port | aging time |
|---|---|---|---|---|
| 1 | 1 | 1515.1515.1515 | 133 | 1 |
| 1 | 1 | 1616.1616.1616 | 133 | 1 |
| 1 | 2 | 2525.2525.2525 | 133, 134 | 1 |
| 1 | 2 | 2626.2626.2626 | 133, 134 | 1 |
| 1 | 3 | 3535.3535.3535 | 131 | 1 |
| 1 | 3 | 3636.3636.3636 | 132 | 1 |
| 1 | 4 | 4545.4545.4545 | 134 | 1 |
| 1 | 4 | 4646.4646.4646 | 134 | 1 |

Fig.10d

| VLAN ID | switch ID | MAC address | output port | aging time |
|---|---|---|---|---|
| 1 | 1 | 1515.1515.1515 | 143, 144 | 1 |
| 1 | 1 | 1616.1616.1616 | 143, 144 | 1 |
| 1 | 2 | 2525.2525.2525 | 143 | 1 |
| 1 | 2 | 2626.2626.2626 | 143 | 1 |
| 1 | 3 | 3535.3535.3535 | 144 | 1 |
| 1 | 3 | 3636.3636.3636 | 144 | 1 |
| 1 | 4 | 4545.4545.4545 | 141 | 1 |
| 1 | 4 | 4646.4646.4646 | 142 | 1 |

SYSTEM AND METHOD FOR CONTROLLING NETWORK TRAFFIC

CROSS-REFERENCE TO RELATED APPLICATIONS

This application claims all benefits of Korean Patent Application No. 2005-0054514 filed on Jun. 23, 2005 in the Korean Intellectual Property Office, the disclosures of which are incorporated herein by reference.

BACKGROUND OF THE INVENTION

1. Field of the Invention

The present invention relates to a system for controlling a network traffic path, and more particularly to a network traffic controlling system allowing all switches consisting a network to individually determine the best switching path, rather than to determine switching path by a single root switch as the prior art. In addition, the invention relates to a network traffic controlling method using such network traffic controlling system.

2. Description of the Prior Art

Figure 1:
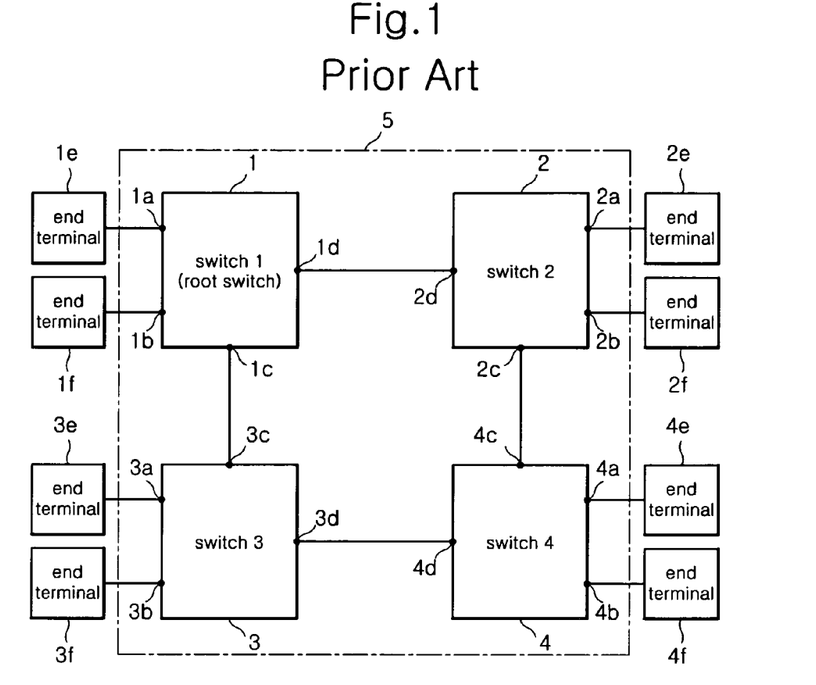
FIG. 1 is a conceptional view showing a network traffic controlling system according to the prior art.

As shown in FIG. 1, according to the prior art, a switch network 5 comprises multiple switches 1, 2, 3, 4 connected together and multiple end terminals 1e, 1f, 2e, 2f, 3e, 3f, 4e, 4f connected to each of the switches 1, 2, 3, 4. In this case, for example, personal computers, servers, routers and the like are used as the end terminals 1e, 1f, 2e, 2f, 3e, 3f, 4e, 4f.

At this time, each of the switches 1, 2, 3, 4 has ports 1a, 1b, 2a, 2b, 3a, 3b, 4a, 4b for connection with the end terminals 1e, 1f, 2e, 2f, 3e, 3f, 4e, 4f and ports 1c, 1d, 2c, 2d, 3c, 3d, 4c, 4d for connection with other switches.

Conventionally, in order to prevent a frame loop in advance, which can occur in frame switching, a particular switch, for example the switch 1 of the whole switches 1, 2, 3, 4 is selected as a root switch. Accordingly, all frame switching paths of the other switches 2, 3, 4 are determined in reference to the switch 1.

However, when the frame switching operations of the switches 2, 3, 4 are determined by the switch 1, i.e., root switch, there occur many inefficient and unreasonable situations.

For example, under circumstances that switching paths of the whole network are built around the switch 1, frames from switch 3 to switch 4 take a far and inefficient route through <switch 3-switch 1-switch 2-switch 4> even though there exists a near path made through the ports 3d, 4d.

In other words, according to the single root switch based topology of the prior art, it is highly probable that each of the switches 2, 3, 4 cannot use an optimized switching path when switching frames and is forced to use an inefficient flooding path when flooding frames.

For another example, each of the switches 2, 3, 4 is forced to delay a long time for activation of an alternate port so as to prevent a frame loop from occurring, when its primary link is down. As a result, communications between end terminals 2e, 2f, 3e, 3f, 4e, 4f connected to switches 2, 3, 4 are discontinued for a long time.

In other words, according to the root switch based topology of the prior art, when there occurs a failure in a primary port, each of the switches 2, 3, 4 is forced to delay a long time for activation of a alternate port, concerning about an occurrence of a frame loop.

For still another example, when an ill-intentioned user makes a manipulation of illegally setting another specific switch, for example the switch 4 as a false root switch, rather than the legal root switch, i.e., switch 1, the other switches 1, 2, 3 knowing nothing about it switch all traffics around the switch 4. Under such circumstance, if the switch 4 is inferior to the existing switch 1, each of the switches 1, 2, 3 forms the worst topology in an instant.

In addition, under situation that a switching path is determined in reference to the false root switch, i.e., the switch 4, if an ill-intentioned user connects an monitoring tool to the switch 4 and maliciously monitors all frames passing through the switch 4, users using each of the end terminals 1e, 1f, 2e, 2f, 3e, 3f suffer such serious damage that the user's information is leaked to the ill-intentioned user or modified or damaged.

In other words, according to the single root switch based structure of the prior art, the user (each of the switches) cannot efficiently cope with security infringement of a network using a non-authenticated false root switch or similar tool or program.

Further, when a switching path of a whole network is determined in reference to the switch 1, each of the switches 2, 3, 4 cannot use multiple paths leading to the same destination because it is worried about an occurrence of the frame loop. Accordingly, switching path load balancing in the same VLAN cannot be achieved.

In other words, according to the root switch based topology of the prior art, each of the switches 2, 3, 4 cannot use redundant paths when forwarding frames because it is worried about the occurrence of the frame loop.

SUMMARY OF THE INVENTION

Accordingly, the present invention has been made to solve the above problems. An object of the invention is to allow all switches connected with a same VLAN to share the information regarding <a unique ID of each switch>, <port ID connecting the switches>, <bandwidth of ports connecting switches> and the like in order for each of the switches to provide <a method allowing all switches constituting a system to use best switching paths when switching frames between the switches>, <a method allowing all switches constituting a system to use an optimized flooding path in which a frame loop does not occur, when flooding frames between the switches>, <a method of activating alternate ports without delay in case of a failure of the primary port connecting the switches>, <a method capable of preventing a security infringement of a switch network using a non-authenticated switch or similar tool or program> and <a method capable of a load balancing using redundant links when forwarding frames between switches>.

In order to achieve the above object, there is provided a network traffic controlling system comprising:

multiple switches connected to each other;

multiple ports individually mounted to each of the switches and providing links between switches or between switch and its attached end terminals; and a switching control module individually mounted to each of the switches, real-time exchange switch state information with other switches whenever switch status is changed, and selecting ports based on the switch state information to forward a frame from directly connected end terminals or other switches depending on characteristics of the frame.

According to another aspect of the invention, there is provided a network traffic controlling method being processed by a switching control module individually mounted to each of the switches connected to other switches through ports, the method comprising steps of:

building a neighborship according to frames transmitted from certain neighbor switch among other switches;

synchronizing switch state information, wherein switch state information retained, with other switches whenever the switch state is changed;

updating and creating a switching table depending on the information of the synchronized switch state information; and processing a data frame, wherein after a data frame is received, the received data frame is switched or flooded to ports connecting to the destination depending on characteristics of the data frame, with reference to the switching table.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. In the following description of the present invention, a detailed description of known functions and configurations incorporated herein will be omitted when it may make the subject matter of the present invention rather unclear.

Figure 2:
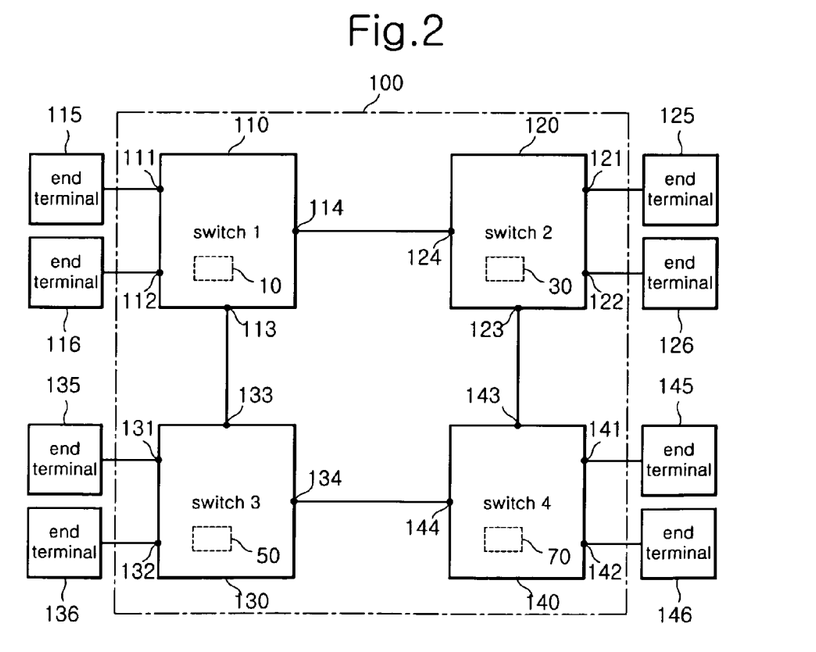
FIG. 2 is a conceptional view showing a network traffic controlling system according to an embodiment of the invention.

As shown in FIG. 2, a network traffic controlling system 100 according to an embodiment of the invention is a systematically structured system comprising multiple switches 110, 120, 130, 140 connected to each other and multiple end terminals 115, 116, 125, 126, 135, 136, 145, 146 arranged to each of the switches 110, 120, 130, 140.

At this time, ports 111, 112, 121, 122, 131, 132, 141, 142 each connects end terminals 115, 116, 125, 126, 135, 136, 145, 146 to switches 110, 120, 130, 140, and ports 113, 114, 123, 124, 133, 134, 143, 144 each connects other switches.

Hereinafter, for convenience sake, it is assumed that IDs of the switches 100, 120, 130, 140 are respectively 1, 2, 3 and 4, each speed (bandwidth) of the ports 111, 112, 121, 122, 131, 132, 141, 142 connecting the switches 110, 120, 130, 140 each other is all 100 Mbps, and VLAN 1 is set to all ports 111, 112, 121, 122, 131, 132, 141, 142 connecting the switches 110, 120, 130, 140 each other.

Under structure of the network traffic controlling system 100 according to an embodiment of the invention, switching control modules 10, 30, 50, 70, which are inherent to the invention, are further arranged in each of the switches 110, 120, 130, 140, as shown in FIG. 2.

In this case, the switching control modules 10, 30, 50, 70 are individually mounted to each switch 110, 120, 130, 140, and perform functions of real-time exchanging switch state information retained by the other switches whenever the information is changed and selecting the ports 111, 112, 121, 122, 131, 132, 141, 142, 113, 114, 123, 124, 133, 134, 143, 144 based on the switch state information to forward frames received from end terminals directly connected to it or from other switches depending on characteristics of the frames.

As described above, when synchronization of the switch state information is completed, all switches 110, 120, 130, 140 connected with a same VLAN can perceive IDs of the other switches, IDs of the ports connecting the switches each other and bandwidth of the ports. As a result, each of the switches 110, 120, 130, 140 can independently determine best frame switching path, rather than determine a frame path around a single root switch as the prior art.

Figure 3:
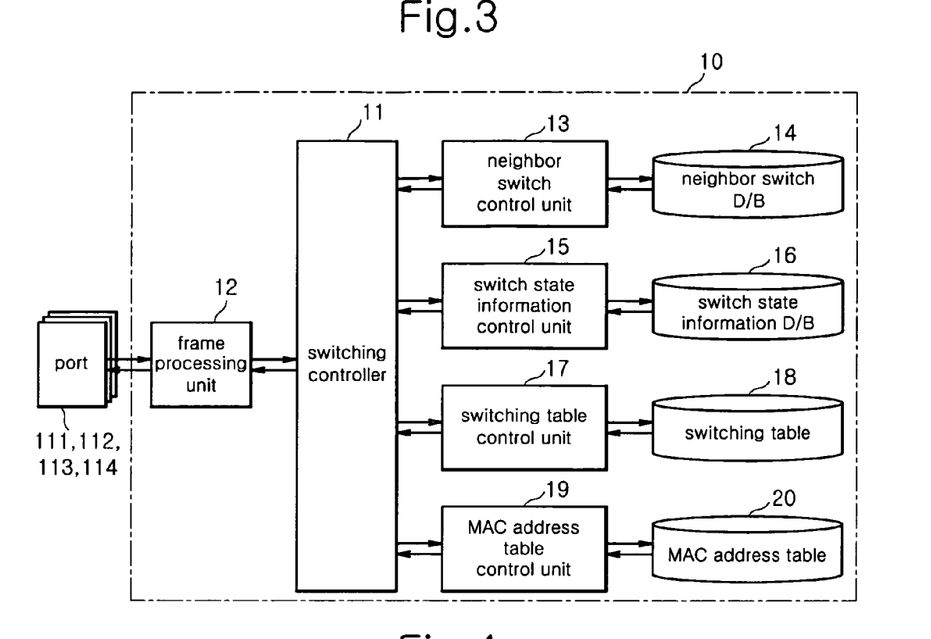
FIG. 3 is a conceptional view showing a detailed structure of a switching control module arranged to each switch according to an embodiment of the invention.

Under such structure, each of the switching control module 10, 30, 50, 70 according to the invention, for example, the switching control module 10 takes such structure that a switching controller 11, a frame processing unit 12 controlled by the switching controller 11, a neighbor switch control unit 13, a switch state information control unit 15, a switching table control unit 17, a media access control (MAC) address table control unit 19 and the like are systematically combined as shown in FIG. 3 (since functions and process executions of individual constituting elements contained in each of the switches are all the same, function and process execution of each constituting element will be described on the basis of the switch1).

At this time, the switching controller 11 of the switching control module 10 performs functions of controlling a process of forming neighborships with neighbor switches directly connected to the self-switch1 110, a process of synchronizing switch state information, a process of maintaining a switching table 18 according to the switch state information, and a process of switching or flooding frames depending on the information of the switching table 18.

Under such situations, the frame processing unit 12 which is controlled by the switching controller 11 receives a frame through the ports 111, 112, 113, 114 and then examines the header of the received frame to check information like source switch ID, destination switch ID, source MAC address, destination MAC address, Hop limit, error occurrence and so on. If there is an abnormality, the frame processing unit discards a corresponding frame. If there is no abnormality, the frame processing unit pass control for the frame to the neighbor switch control unit 13, the switch state information control unit 15, the MAC address table control unit 19 and the like, depending on the frame type (control frame, data frame and the like).

Further, the frame processing unit 12 creates a frame header appropriate for each frame type, and switches or floods the frame.

Figure 4:
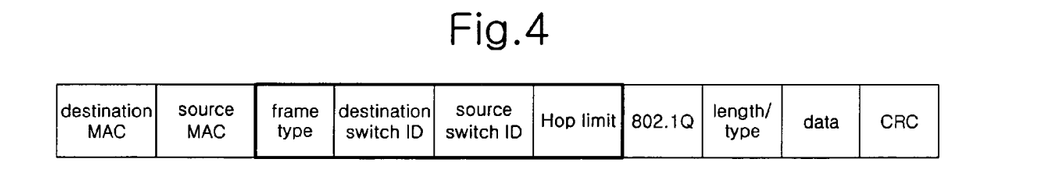
FIG. 4 is a conceptional view showing a format of a frame according to an embodiment of the invention.

In this case, in all frames exchanged between switches 110, 120, 130, 140, frame type, destination switch ID, source switch ID and Hop limit fields are located next to the source MAC address of an Ethernet frame header, as shown in FIG. 4.

The frame type indicates whether the current frame is a control frame or a data frame, and the Hop limit field is used to prevent frame loops. In this case, the Hop limit count is reduced by one whenever the frame passes though each of the switches. Under such situations, the frame processing unit 12 discards the frame with the value of the Hop limit is 0 (zero), thereby preventing a frame loop that may possibly occur.

In the mean time, the neighbor switch control unit 13 controlled by the switching controller 11 serves to build neighborships with other switches depending on contents of a hello frame (for example, whether or not the self switch ID is recorded in a neighbor switch list item of the hello frame) and records, updates and manages the result to the neighbor switch D/B 14.

Figure 5:
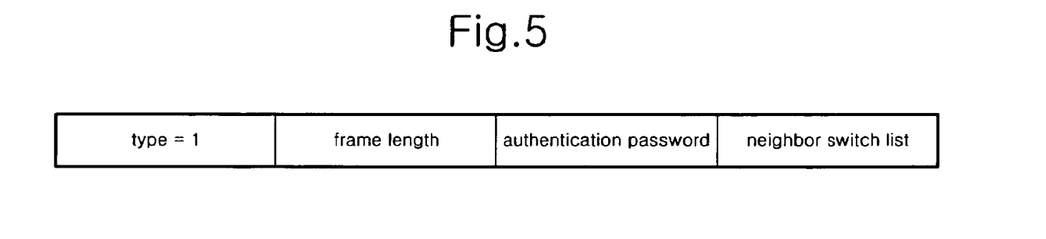
FIG. 5 is a conceptional view showing a format of a hello frame according to an embodiment of the invention.

In this case, the contents of the ahead hello frame are located in data field of the Ethernet frame, with the information (for example, type, frame length, authentication password, neighbor switch list and the like) as shown in FIG. 5.

Figure 6A:
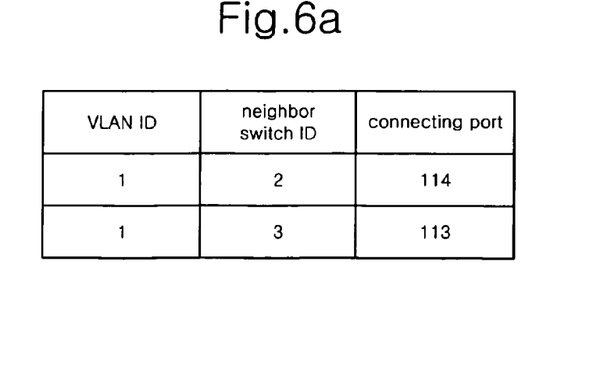
FIGS. 6a to 6d are conceptional views showing data storing states of each neighbor switch D/B arranged to switch 1 to switch 4 according to an embodiment of the invention.
Figure 6B:
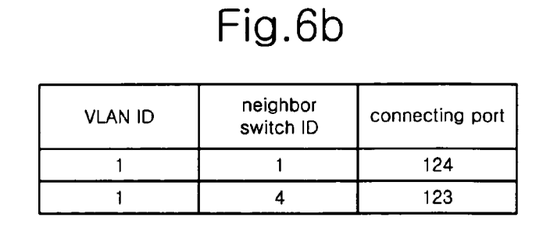
Figure 6C:
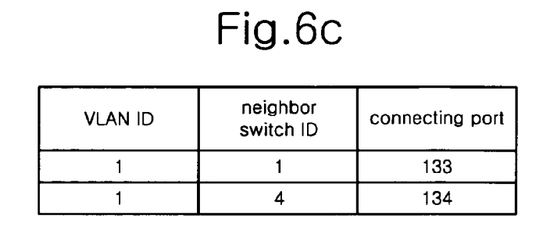
Figure 6D:
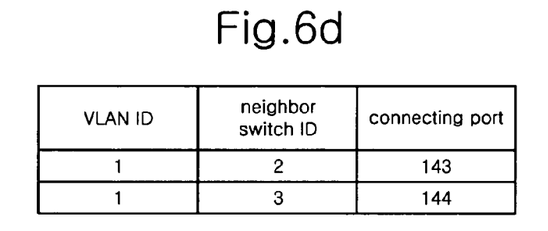

Under such situations that the neighbor switch control unit 13 performs the functions, each neighbor switch D/B 14 stored in each of the switches 110, 120, 130, 140 maintain information such as neighbor switch ID, port ID to be connected to the neighbor switch, VLAN ID the port belongs to and the like, as shown in FIGS. 6a to 6d (FIG. 6a shows the neighbor switch D/B contents of the switch1, FIG. 6b shows the neighbor switch D/B contents of the switch2, FIG. 6c shows the neighbor switch D/B contents of the switch3, and FIG. 6d shows the neighbor switch D/B contents of the switch4).

In addition, the switch state information control unit 15 controlled by the switching controller 11 serves to update and manage the switch state information recorded in the switch state information D/B 16, depending on changed contents of the state information frame of the self-arranged switch 110 (i.e., switch 1) or the switch state information frame received (transmitted) from the other switches 120, 130, 140 (for example, whether received switch state information is new or not, compared to the already stored information).

Figure 7:
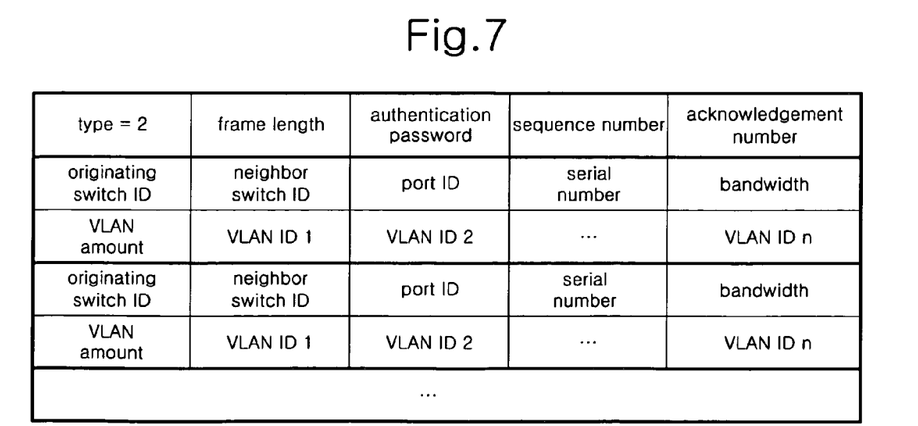
FIG. 7 is a conceptional view showing a format of a switch state information frame according to an embodiment of the invention.

In this case, the contents of the ahead switch state information frame are located in data field of the Ethernet frame, with the information (for example, type, frame length, authentication password, frame number, acknowledgement number, created switch ID, other switch ID, port ID, created sequence number, bandwidth and the like) as shown in FIG. 7.

Figure 8:
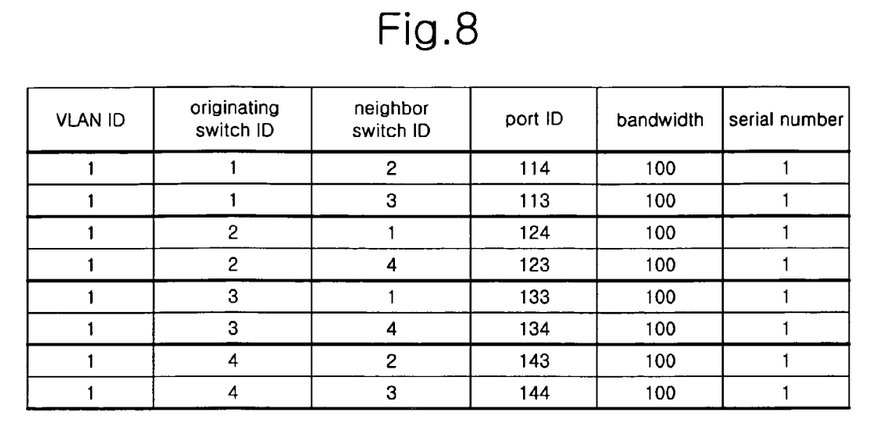
FIG. 8 is a conceptional view showing a data storing state of each switch state information D/B arranged to switch1 to switch4 according to an embodiment of the invention.

When the switch state information control unit 15 performs the functions, the switch state information stored in the switch state information D/B 16 of each switches 110, 120, 130, 140 can be synchronized to maintain all the information such as VLAN ID, originating switch ID, neighbor switch ID, port ID, bandwidth, sequence number and the like to be same, as shown in FIG. 8.

After <the updating procedure of the switch state information D/B 16> is processed, the switch state information control unit 15 again determines whether there exists a neighbor switch to which the switch state information should be sent, among the neighbor switches connected with the same VLAN ID. If there exists a corresponding neighbor switch, the switch state information control unit further processes a procedure of sending the switch state information to each of the neighbor switches, with reference to the ahead neighbor switch D/B 14.

As a result, all the switches connected with the same VLAN can have identical information such as <switch ID>, <port ID connecting the switches each other>, <bandwidth> and the like, through the <information synchronization procedure> of the invention.

In the mean time, the switching table control unit 17 controlled by the switching controller 11 applies the Dijkstra algorithm based on the contents recorded in the above described switch state information D/B 16 to determine <the best paths to another switch through a specific VLAN> and to update the switching table 18.

Figure 9A:
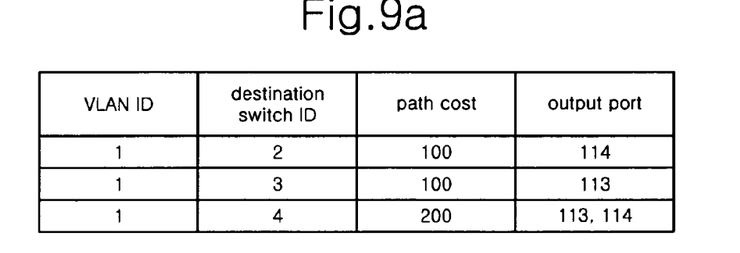
FIGS. 9a to 9d are conceptional views showing data storing states of each switching tables arranged to switch1 to switch4 according to an embodiment of the invention.
Figure 9B:
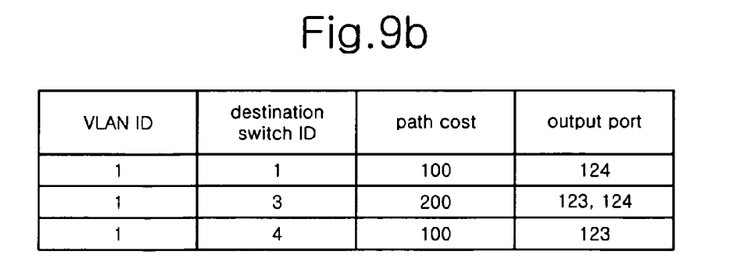
Figure 9C:
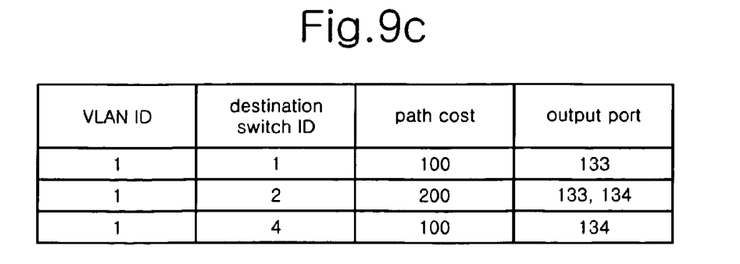
Figure 9D:
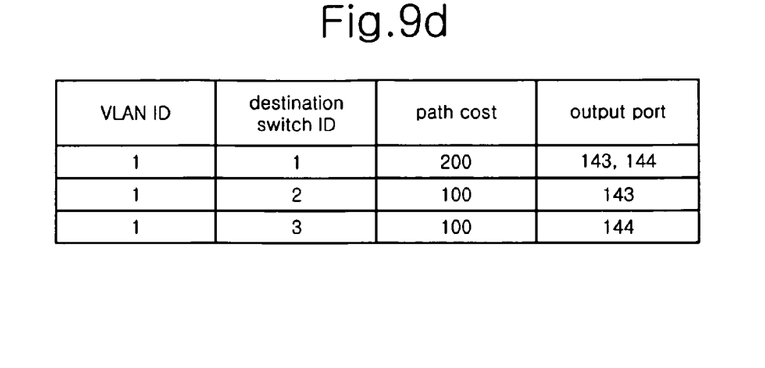

As a result that each switching table control unit 17 performs the functions thereof, the switching tables 18 of the switches 110, 120, 130, 140, which are finally created, can maintain <the information for the best path (path cost, output port) to the destination switch>, as shown in FIGS. 9a to 9d (FIG. 9a shows contents of the switching table of the switch1, FIG. 9b shows contents of the switching table of the switch2, FIG. 9c shows contents of the switching table of the switch3 and FIG. 9d shows contents of the switching table of the switch4).

In addition, when a frame is received via the ports 111, 112, 113, 114, the MAC address table control unit 19 controlled by the switching controller 11 checks the source MAC address of the frame and updates the MAC address table 20.

At this time, if the source MAC address of the frame does not exist in the MAC address table 20, the MAC address table control unit 19 processes a procedure of recording an ID of the VLAN to which the frame belongs, an ID of the switch from which the frame is first originated, a corresponding MAC address, the number of the port having received the frame and the like to the MAC address table 20.

However, if the source MAC address of the frame exists in the MAC address table 20, the MAC address table control unit 19 resets aging timer of the MAC address.

Figure 10A:
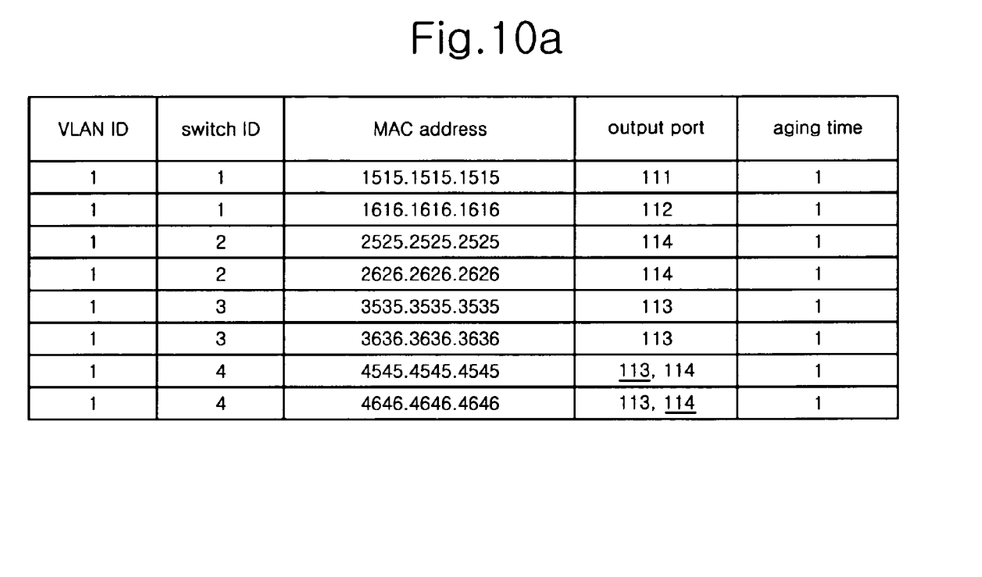
FIGS. 10a to 10d are conceptional views showing data storing states of each MAC address tables arranged to switch1 to switch4 according to an embodiment of the invention.
Figure 10B:
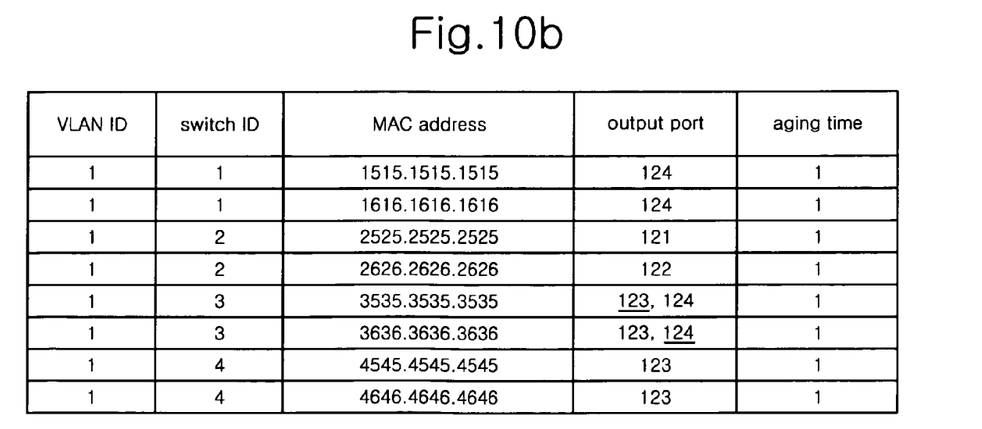
Figure 10C:
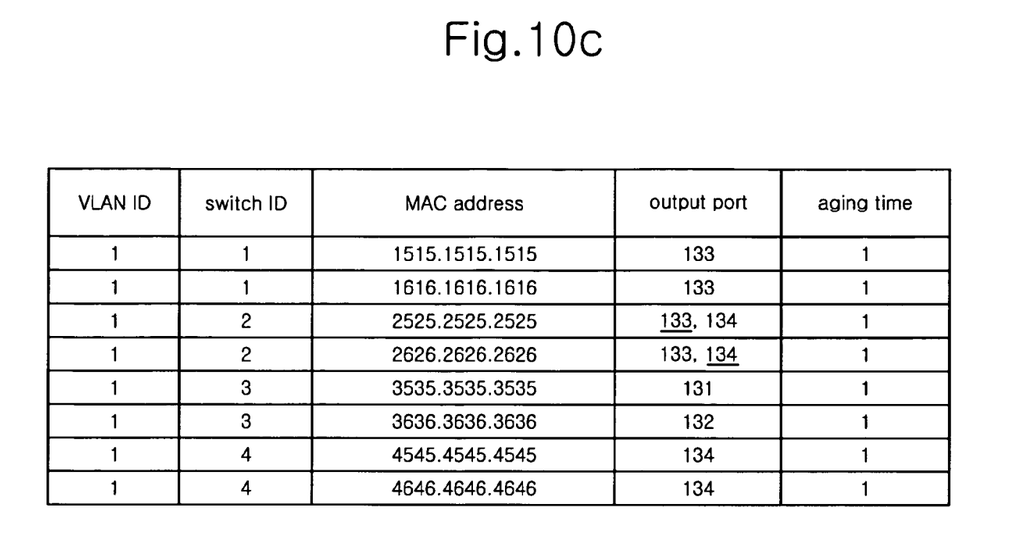
Figure 10D:
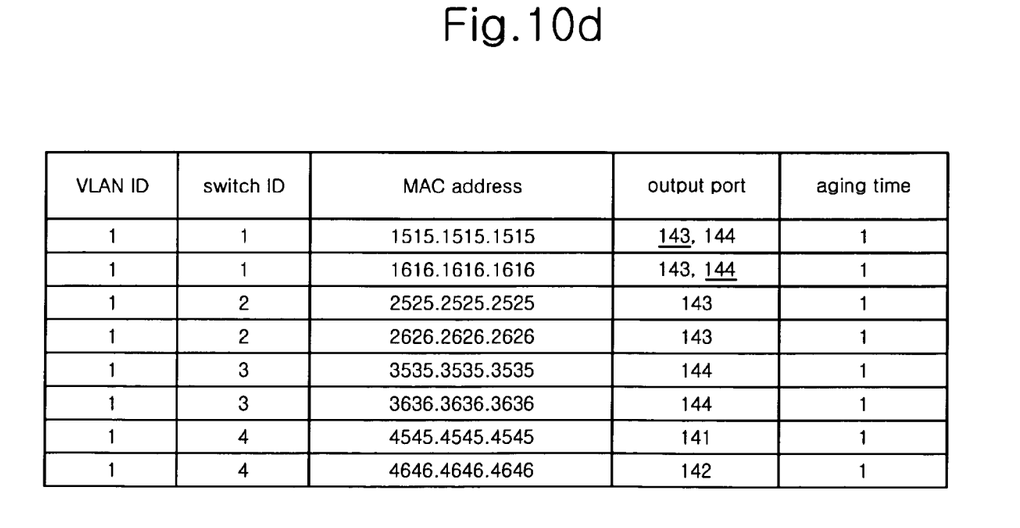

Assuming that the MAC addresses of the end terminals 115, 116 connected to the switch1 110 are 1515.1515.1515 and 1616.1616.1616, the MAC addresses of the end terminals 125, 126 connected to the switch2 120 are 2525.2525.2525 and 2626.2626.2626, the MAC addresses of the end terminals 135, 136 connected to the switch3 130 are 3535.3535.3535 and 3636.3636.3636, the MAC addresses of the end terminals 145, 146 connected to the switch4 140 are 4545.4545.4545 and 4646.4646.4646, and all the end terminals transmit frames, the MAC address tables of the switches 110, 120, 130, 140 have the recorded information as shown in FIGS. 10a to 10d (FIG. 10a shows contents of the MAC address table of the switch1, FIG. 10b shows contents of the MAC address table of the switch2, FIG. 10c shows contents of the MAC address table of the switch3 and FIG. 10d shows contents of the MAC address table of the switch4).

Hereinafter, a network traffic controlling method of the invention using the network traffic controlling system 100 having the above described structure will be specifically explained.

Figure 11:
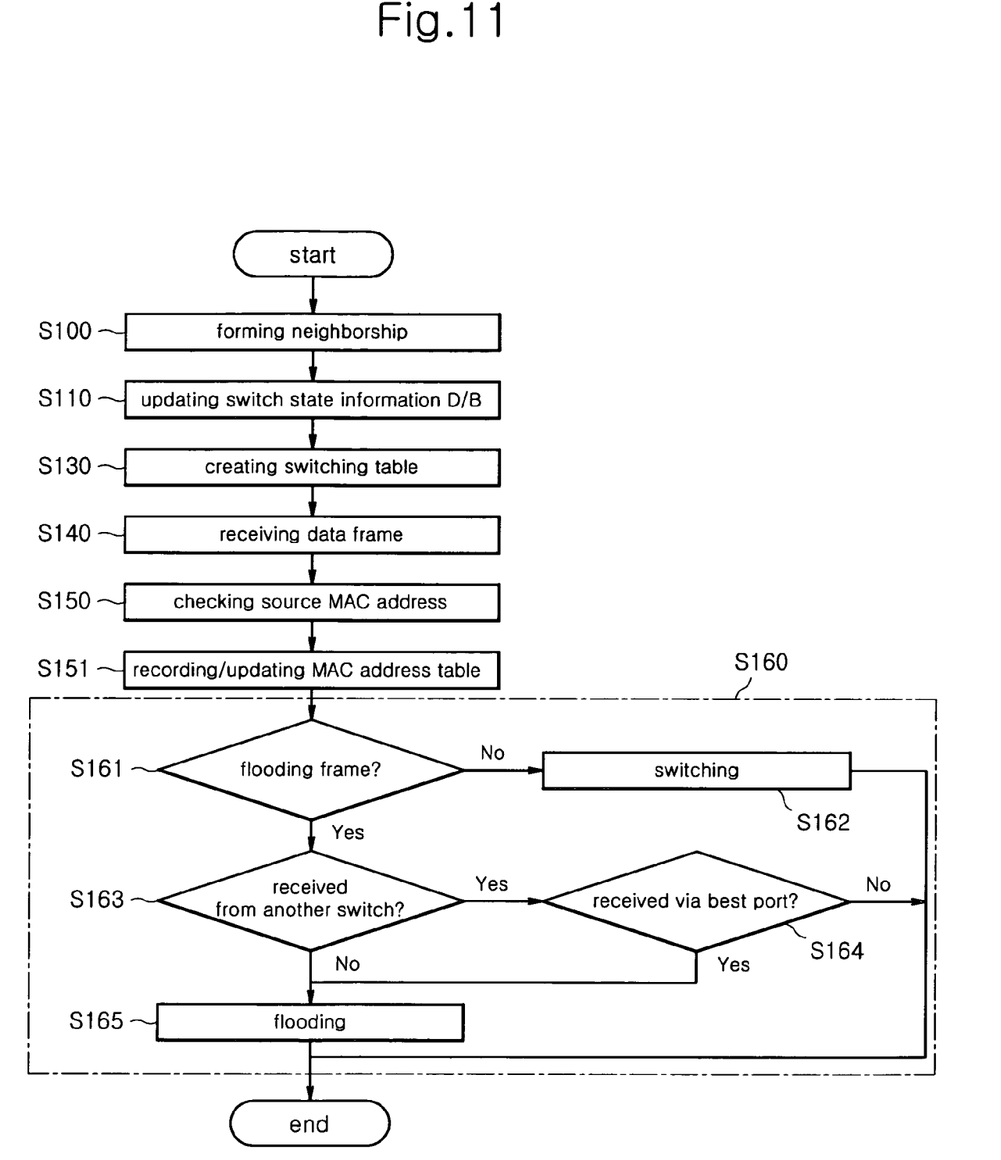
FIG. 11 is a flow chart sequentially showing a network traffic controlling method according to an embodiment of the invention.

As shown in FIG. 11, under circumferences that the invention is embodied, the switching controllers of the switching control module 10, 30, 50, 70 mounted to the switches 110, 120, 130, 140, for example the switching controller 11 mounted to the switch1 110 processes a forming neighborship procedure by updating the neighbor switch D/B 14, based on the information of the frame (for example, hello frame as shown in FIG. 5) received from the neighbor switches, for example the switch2 120 and the switch3 130 (S100).

Figure 12:
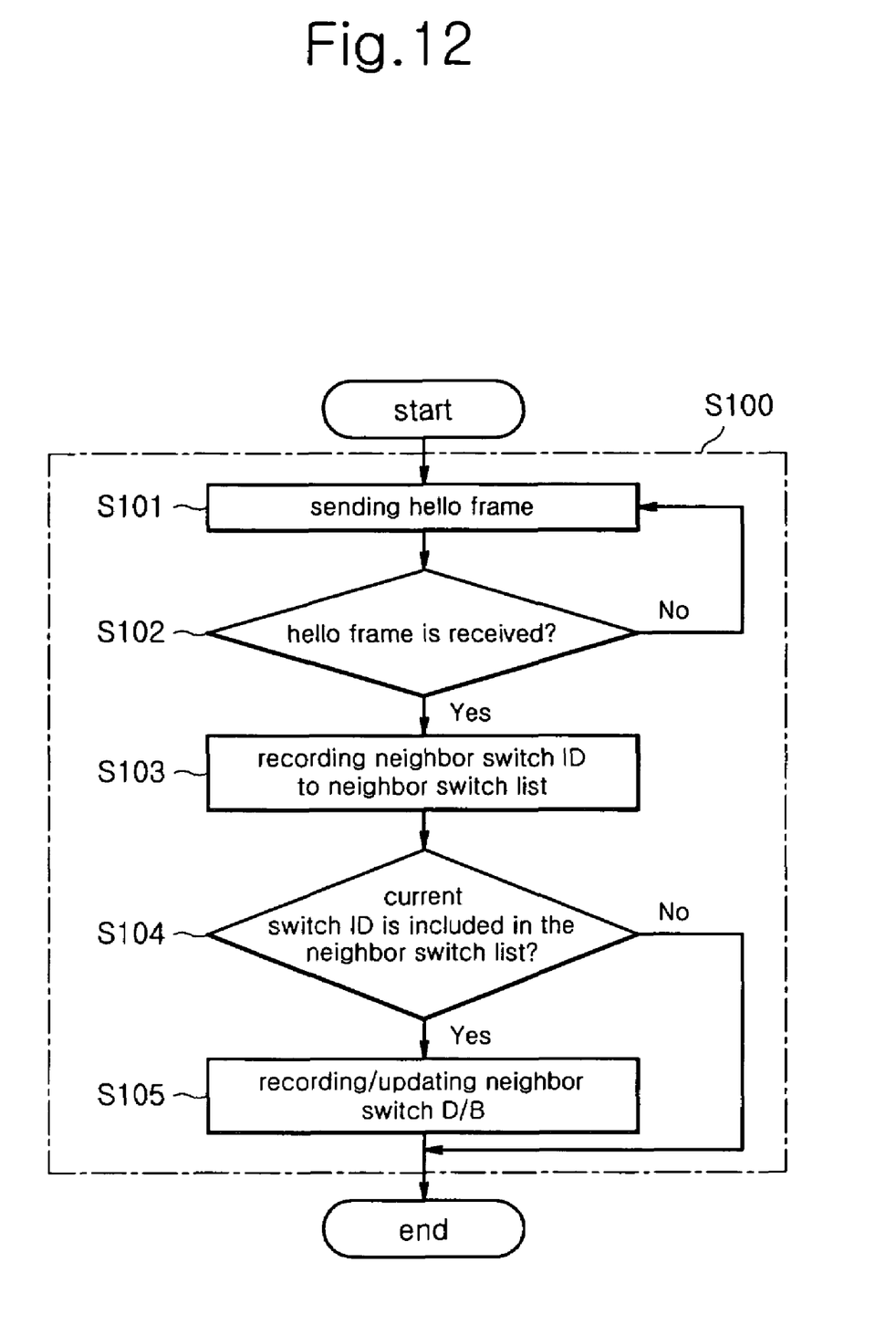
FIG. 12 is a flow chart sequentially showing a process of forming a neighborship according to an embodiment of the invention.

In this case, as shown in FIG. 12, the switching controller 11 first initializes the neighbor switch D/B 14 using the neighbor switch control unit 13, and then sends hello frame periodically to all activated ports (S101) and determines whether hello frames sent by the neighbor switches 120, 130 are received or not (S102).

At this time, if the hello frames from the neighbor switches 120, 130 are received, the switching controller 11 determines whether the password in the hello frame is identical with the already registered password of the corresponding neighbor switches 120, 130 using the neighbor switch control unit 13 and discards the frames when the passwords are different from each other (in embodying the invention, when it is desired to use authentication password for diverse control frames which are transmitted/received between neighbor switches, for example hello frame, switch state information frame, acknowledgement frame and the like, the processing manner thereof is the same as that described above and thus descriptions of the case of using the password will be omitted for convenience sake).

However, when the password in the hello frames received from the neighbor switches 120, 130 is identical with registered password of the neighbor switches 120, 130 or a password is not used, the switching controller 11 processes a procedure of adding the ID of the neighbor switch (i.e., neighbor switch having transmitted the hello frame) to the neighbor switch list in the hello frame which will be sent from that time on.

Subsequently, the switching controller 11 determines whether its switch ID is in the neighbor switch list of the hello frame received from other switches (S104). If the switch ID of the received switch is included in the neighbor switch list of the hello frame received from the other, the controller considers the other switch as a neighbor switch and records the corresponding switch information to the neighbor switch D/B 14 using the neighbor switch control unit 13 (S105). As a result, the neighbor switch information stored in the neighbor switch D/B 14 of each switch 110, 120, 130, 140 can maintain the recorded information as shown in FIGS. 6a to 6d (for example, neighbor switch ID, port number connecting the neighbor switch, VLAN number connected to the neighbor switch and the like).

In the mean time, when the process of forming neighborship is completed through the above procedures, the switching controller 11 processes a procedure of synchronizing the switch state information with the other switches 120, 130, 140 (S110).

Figure 13A:
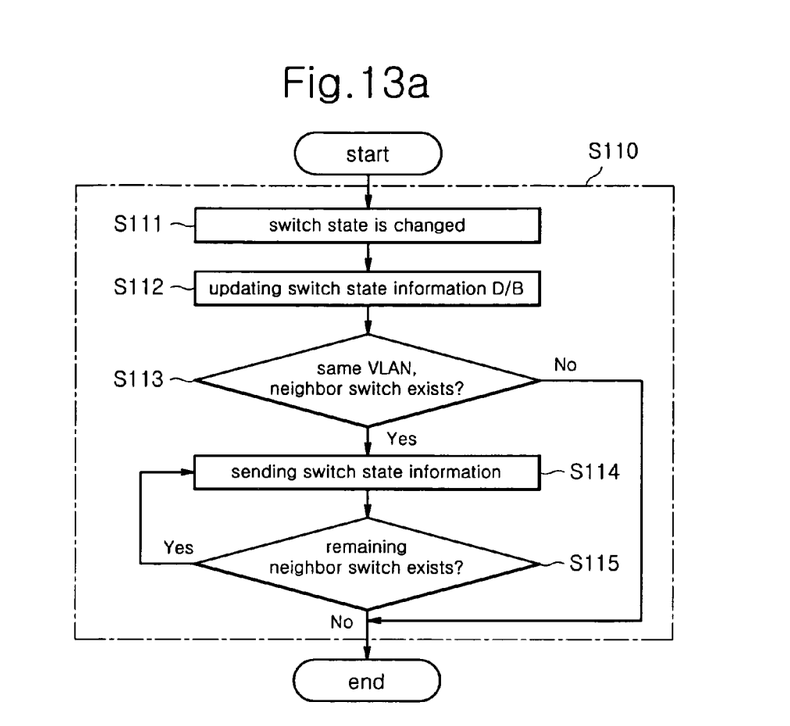
FIGS. 13a to 13b are flow charts sequentially showing a process of forwarding/receiving switch state information according to an embodiment of the invention.

In this case, as shown in FIG. 13a, the switching controller 11 checks the state changes such as new neighborship, receipt of new switch state information frame from neighbor switch, addition of VLAN's, change of bandwidth and the like, using the switch state information control unit 15 and thus determines whether the switch state information is updated or not (S111).

At this time, if it is determined that the switch state information is changed, the switching controller 11 updates the changed information to the switch state information D/B 14 using the switch state information control unit 15 (S112) and then determines whether there exists a switch to which the new switch state information should be sent, among the neighbor switches connected with the same VLAN (S113).

If there exists a remaining switch except the switch having sent the switch state information, the switching controller 11 forwards the ahead new switch state information to the other switch, for example switch2 120 or switch3 130 (S114).

Subsequently, the switching controller 11 determines the receipt of acknowledgement frames from the other switches 120, 130 having received the ahead switch state information frames, using the switch state information control unit 15.

Figure 14:
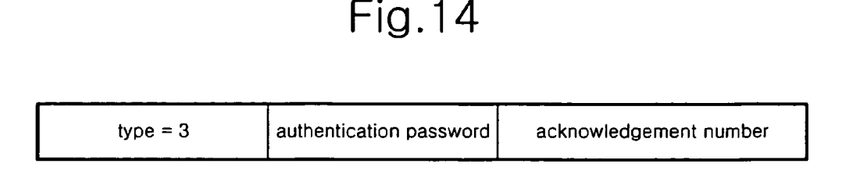
FIG. 14 is a conceptional view showing a format of a acknowledgement frame according to an embodiment of the invention.

In this case, the acknowledgement frame includes information such as frame type, authentication password, acknowledgement number and the like as shown in FIG. 14.

At this time, acknowledgement frames are not received from the other neighbor switches 120, 130 having received the ahead switch state information frames within retransmit interval, the switching controller 11 retransmits the same switch state information frame for a predetermined count. Nevertheless, if acknowledgement frames are not received from the other neighbor switches 120, 130, the controller resets the existing neighbor relations with the switches 120, 130.

However, if acknowledgement frames are received from the other neighbor switches 120, 130 having received the ahead switch state information frames, the switching controller 11 determines whether there is remaining switch state information having not been transmitted in the switch state information D/B 16. When there exists, it repeatedly transmits the remaining switch state information.

After sending all the new switch state information to the specific neighbor switches connected with the same VLAN through the above procedures, the switch control controller 11 checks whether there exists a remaining neighbor switch to which the new switch state information should be sent (S115). If there exists, it sends the new switch state information.

Figure 13B:
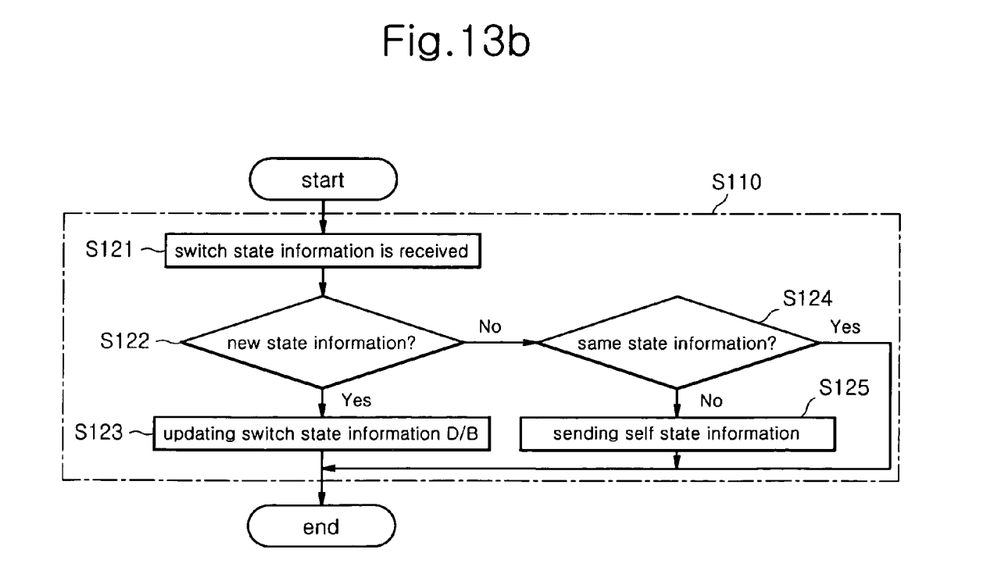

In the mean time, when receiving the switch state information frame, the switch control controller 11 processes a procedure based a flowchart as shown in FIG. 13b.

In this case, the switch control controller 11 first determines whether the switch state information frame is received from the other neighbor switches 120, 130 through the frame processing unit 12 (S121).

At this time, when the switch state information frame is received from the other neighbor switches 120, 130, the switch control controller 11 transmits acknowledgement frame (refer to FIG. 14) to the switch which sent the switch state information frame and then determines whether the information in the switch state information frame is new compared to that of the already stored in the switch state information D/B 16 (S122). If it is new, the controller stores the new information in the switch state information D/B (S123).

At this time, if it is determined that the information of the received switch state information frame is same as the switch state information already stored in its switch state information D/B 16, the switch control controller 11 ignores the received information (S124).

However, if it is determined that the data in the switch state information frame is old compared to the switch state information already stored in its switch state information D/B 16, the switch control controller 11 sends its switch state information frame to the neighbor switch so that the neighbor switches 120, 130 can retain the newest information (S125).

As a result, when the above process of synchronizing the switch state information is completed, all the switches connected with the same VLAN will have the identical switch state information D/B 16, as shown in FIG. 8.

With the synchronized switch state information, each of the switches 110, 120, 130, 140 can independently determine best switching paths, rather than determine frame paths by a single root switch.

Needless to say, under the situations that the independent frame switching path is structured, all the switches 110, 120, 130, 140 connected with the same VLAN can independently switch or flood frames using the synchronized switching state information retained by itself, without the need of the single root switch. As a result, optimized switching and flooding paths are built without a frame loop.

In case of active link failure, under the situations that the independent frame switching path is determined, each of the switches 110, 120, 130, 140 can activate alternate ports immediately without an occurrence of a frame loop. As a result, the end terminals 115, 116, 125, 126, 135, 136, 145, 146 connected to the switches 110, 120, 130, 140 can resume communication in the shortest time.

Additionally, under the information share management structure of each of the switches 110, 120, 130, 140 connected with the same VLAN, even when an ill-intentioned user tries an illegal operation using a non-authenticated switch or similar tool or program, each of the switches 110, 120, 130, 140 serves as a separate root switch and can thus independently operate. Accordingly, it is possible to normally progress the frame switching procedure given to itself, without a particular effect.

Needless to say, since each of the switches 110, 120, 130, 140 builds an optimized path according to an independent determination even when an illegal operations is tried with the non-authenticated switch or similar tool or program, the user can easily prevent such serious damages that the information of the user is leaked to an ill-intentioned user or modified or damaged by the ill-intentioned user.

Further, when the information of the switches 110, 120, 130, 140 are share-managed, each of the switches 110, 120, 130, 140 uses multiple paths toward the same destination. Accordingly, a very effective load balancing switch path can be built.

Meanwhile, when the switch state information synchronizing step (S110) is completed through the above processes, the switching controller 11 processes a switching table updating step of updating/recording the recorded information of the switching table 18, based on the information of the switch state information stored in the switch state D/B 16 (S130).

Figure 15:
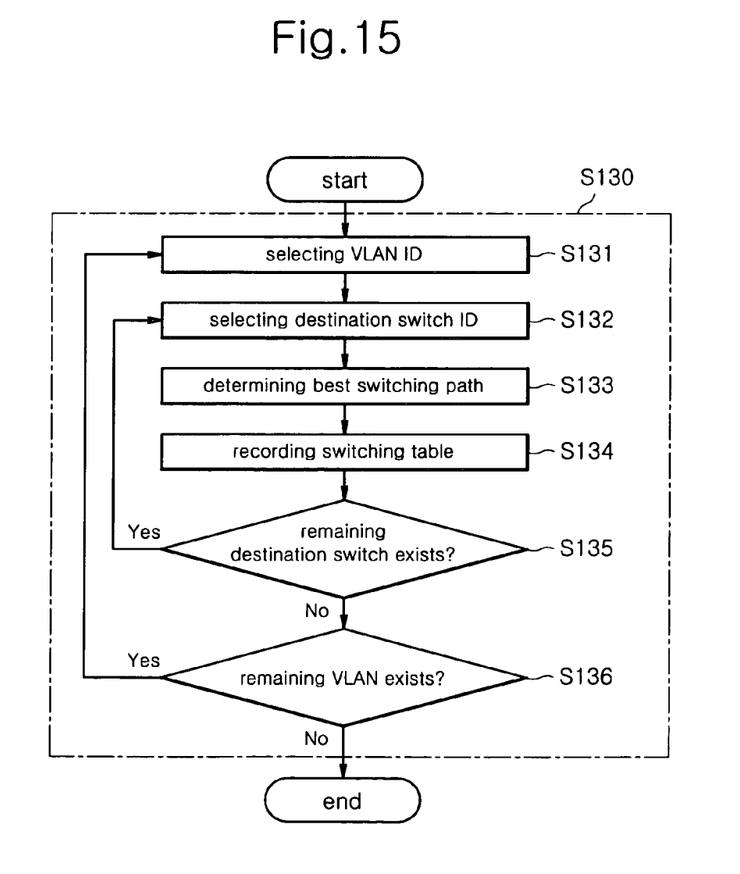
FIG. 15 is a flow chart sequentially showing a process of creating a switching table according to an embodiment of the invention.

In this case, as shown in FIG. 15, the switching controller 11 first selects the switch state information for the first VLAN ID, and again selects the first switch ID from the selected switch state information (S132). Then, the controller applies Dijkstra algorithm to the selected switch state information and calculates <the best paths to the corresponding destination switch through a specific VLAN from the current switch (i.e., switch1)> based on the algorithm (S133) and then records the calculated result to the switching table 18.

After that, when there exists another switch belonging to the same VLAN, the controller repeats the procedures of calculating <the best paths to the selected destination switches> and recording the paths to the switching table (S131, S132, S133, S134).

When the switching path calculation for a specific VLAN is completed through the above procedures, the switching controller 11 determines whether there exists another VLAN in the switch state information D/B (S136). If there exists, the controller repeats the procedures of calculating the best paths for all the destination switches through the same procedures (S131, S132, S133, S134, S135, S136) to create the switching table 18 to which all <the best paths from the current switch to each destination switch through each VLAN assigned to the current switch> are recorded.

When the above procedures are completed, each switching table created in the respective switches can maintain <the recorded information having the best path (port cost, output port) from the self switch to the destination switch through the VLAN included therein>, as shown in FIGS. 9a to 9d.

In the mean time, when the switching table creating process as described above is completed, all the switches 110, 120, 130, 140 arranged to the system 100 of the invention are ready to transmit/receive data frames.

At this time, the manner of forwarding data frames to the destination is divided into switching and flooding. In a narrow sense, the switching is meant to transmit the data frame to specific ports only and the flooding is meant to transmit the received data frame to all the ports except the port having received the frame among the ports assigned to the same VLAN.

When the destination MAC address of the received data frame is a unicast address and present in the MAC address table, each of the switches 110, 120, 130, 140 switches the corresponding frame. When the destination MAC address of the received frame is broadcast or multicast address or is a frame having a unicast MAC address that is not present in the MAC address table, the switches 110, 120, 130, 140 flood the frame.

Under such situations, as shown in FIG. 11, when the switching controller 11 of each switch, for example the switch1 110 receives a data frame through the specific ports 111, 112, 113, 114, it checks the source MAC address using the MAC address table control unit 19 (S150) and updates the recorded information of the MAC address table 20 according to the MAC address information of the frame (S151).

At this time, if the source MAC address recorded to the frame is an address not present in the MAC address table 20, the MAC address table control unit 19 processes a procedure of recording VLAN ID to which the frame is assigned, switch ID from which the frame is first transmitted, a corresponding MAC address, port number having received the frame and the like to the MAC address table 20.

However, if the source MAC address of the frame is present in the MAC address table 20, the MAC address table control unit 19 resets aging timer of the corresponding MAC address.

When the updating procedure of the MAC address table 20 using the source MAC address of the received frame is completed through the above process, the switching controller 11 checks the destination MAC address of the current data frame using the frame processing unit 12 and thus determines whether the current data frame should be flooded or not (S161).

At this time, if the current data frame should not be flooded (i.e., the current frame should be switched because the destination MAC address is present in the MAC address table), the switching controller 11 processes a procedure of forwarding the data frame to a port leading to the destination through the frame processing unit 12 with reference to the MAC address table 20 (S162).

However, if the current data frame should be flooded, the switching controller again determines whether the current data frame is <a frame originated from end terminal attached to it> or <a frame originated from other switch> using the frame processing unit 12 (S163).

At this time, if the flooding frame is <a frame received from other switch>, the switching controller 11 refers to the source switch ID and the switching table 18 through the frame processing unit 12 and floods the frame only when it is received through a best port leading to the source switch (S165) or discards the frame (S164).

When there exist multiple best ports leading to the specific source switch, the switching controller 11 selects the port having the lowest port ID as a best port.

However, if a flooding frame is received from <the end terminal directly connected to the switch (i.e., switch1)>, the switching controller 11 transmits the frame to all ports except a receiving port among the ports assigned to the same VLAN (S165).

Needless to say, under such structure of the invention, since the switching controller 11 determines whether the flooding frame should be received or discarded with reference to the source switch ID of the flooding frame and the switching table 18, each data frame (for example, flooding frame) can use <an best flooding path without an occurrence of a frame loop.>

As described above, according to the invention, since all the switches arranged to the system of the invention share all information about the whole system, it is possible to induce each switch to independently determine and use a best frame switching path. Also, a topology of activated switch network can be intuitively checked, so that it is possible to easily induce the setting, maintenance and troubleshooting processes. In addition, when there occurs a network failure, it is possible to induce so that a alternate path can be used immediately and an internal security infringement of a weak switch network can be prevented. Additionally, an optimized load balancing is embodied, so that it is possible to induce the expensive computation resources such as link connecting the ports or switches to be used to the utmost.

While the invention has been shown and described with reference to certain preferred embodiments thereof, it will be understood by those skilled in the art that various changes in form and details may be made thereto without departing from the spirit and scope of the invention as defined by the appended claims.

What is claimed is:

1. A network traffic controlling method being progressed by a switching control module individually mounted to each switches connected to other switches through ports, the method comprising the steps of:
   building a neighborhood according to frames transmitted from certain neighbor switches among the other switches;
   synchronizing switch state information, wherein switch state information retained by the other switches is real-time exchanged whenever the information is changed;
   updating a switching table according to the synchronized switch state information; and
   processing a data frame, wherein after a data frame is received, the received data frame is switched or flooded to a port connecting to a destination depending on the frame types, with reference to the switching table,
   wherein the step of building the neighborhood comprises sub-steps of:
   determining whether a hello frame is received from the neighbor switches while sending a self hello frame to all activated ports;
   when the hello frame is received from the neighbor switches, determining whether a self switch ID is included in the neighbor switch list of the received hello frame; and
   when the self switch ID is included in the neighbor switch list of the hello frame, recording information of a neighbor switch having transmitted the hello frame to a neighbor switch D/B.

2. The method according to claim 1, wherein the step of building neighborhood further comprises sub-steps of:
   when the hello frame is received from the neighbor switches, determining whether a password in the hello frame is identical with a password of the corresponding neighbor switch already registered; and
   when the password in the hello frame is different from the password of the corresponding neighbor switch already registered, discarding the corresponding hello frame.

3. The method according to claim 1, wherein the step of building neighborhood further comprises a sub-step of: when the hello frame is received from the neighbor switches, adding an ID of a neighbor switch having transmitted the hello frame to a neighbor switch list of a self hello frame to be transmitted subsequently.

4. The method according to claim 1, wherein the step of synchronizing the switch state information comprises sub-steps of:
   checking/determining whether the switch state information is changed or not;
   when the switch state information is changed, recording the changed information to the switch state information D/B;
   determining whether there exists a switch to which the switch state information should be sent among the neighbor switches connected with a same VLAN ID as a VLAN ID set to itself; and
   when there exists the neighbor switch to which the switch state information should be sent, sending the switch state information to a corresponding neighbor switch.

5. The method according to claim 1, wherein the step of synchronizing the switch state information comprises sub-steps of:
   determining whether the switch state information is received from the other switches;
   when the switch state information is received, determining whether the received switch state information is new compared to that of the already stored in the switch state information D/B;
   when the received information is new compared to the information already stored in the switch state information D/B, updating the information already stored in the switch state information D/B, when the recorded information of the switch state information is same as the information already stored in the switch state information D/B, ignoring the corresponding switch state information, and when the recorded information of the switch state information is old compared to the information already stored in the switch state information D/B, sending current switch's switch state information to the other switch to induce retained information of the corresponding switch to be modified.

6. The method according to claim 1, wherein the step of updating/creating the switching table comprises sub-steps of:
   selecting switch state information of another switch having a specific VLAN ID among the synchronized switch state information, calculating a Dijkstra algorithm with regard to the selected switch state information to calculate the fastest path from the current switch to the selected switch via the selected VLAN;
   recording the fastest path from the current switch to the selected switch via the selected VLAN to the switching table; and repeatedly performing the procedures of calculating the Dijkstra algorithm and recording the fastest path to the switching table with regard to state information of still another switches having still another ID to create a final switching table having the fastest path from the current switch to all the other destination switches via all the other VLANs included therein.

7. The method according to claim 1, wherein the step of processing the data frame comprises sub-steps of:

checking a media access control (MAC) address of the data frame to determine whether the data frame is subject to switching or flooding;

when the data frame is to be switched, forwarding the data frame to a port connecting to a destination, with reference to a MAC address table;

when the data frame is to be flooded, determining whether the frame is originated from an end terminal connected to the current switch or a frame originated from other switch;

when the data frame is a frame originated from an end terminal, forwarding the frame to all other switches arranged to the same VLAN as the receiving port; and when the data frame is a frame originated from another switch, further determining whether it is received through an optimized port with reference to a source switch ID of the frame and the switching table and when the frame is received through the optimized port, transmitting the frame to other ports arranged to a same VLAN as the receiving port.

* * * * *